FIG. I

United States Patent Office 3,489,569
Patented Jan. 13, 1970

3,489,569
PROCESS FOR CONTROLLING FLOUR BULK DENSITY
Robert F. Shreve, Kankakee, Ill., and Arthur N. Waggoner, Garland, Tex., assignors to General Mills, Inc., a corporation of Delaware
Filed Oct. 18, 1965, Ser. No. 496,777
Int. Cl. A21d 6/00
U.S. Cl. 99—93                                1 Claim

ABSTRACT OF THE DISCLOSURE

In the milling of hard wheat flour the process of increasing the bulk density of the product by subjecting the flour to aerating gas and drying.

---

Figure 1:
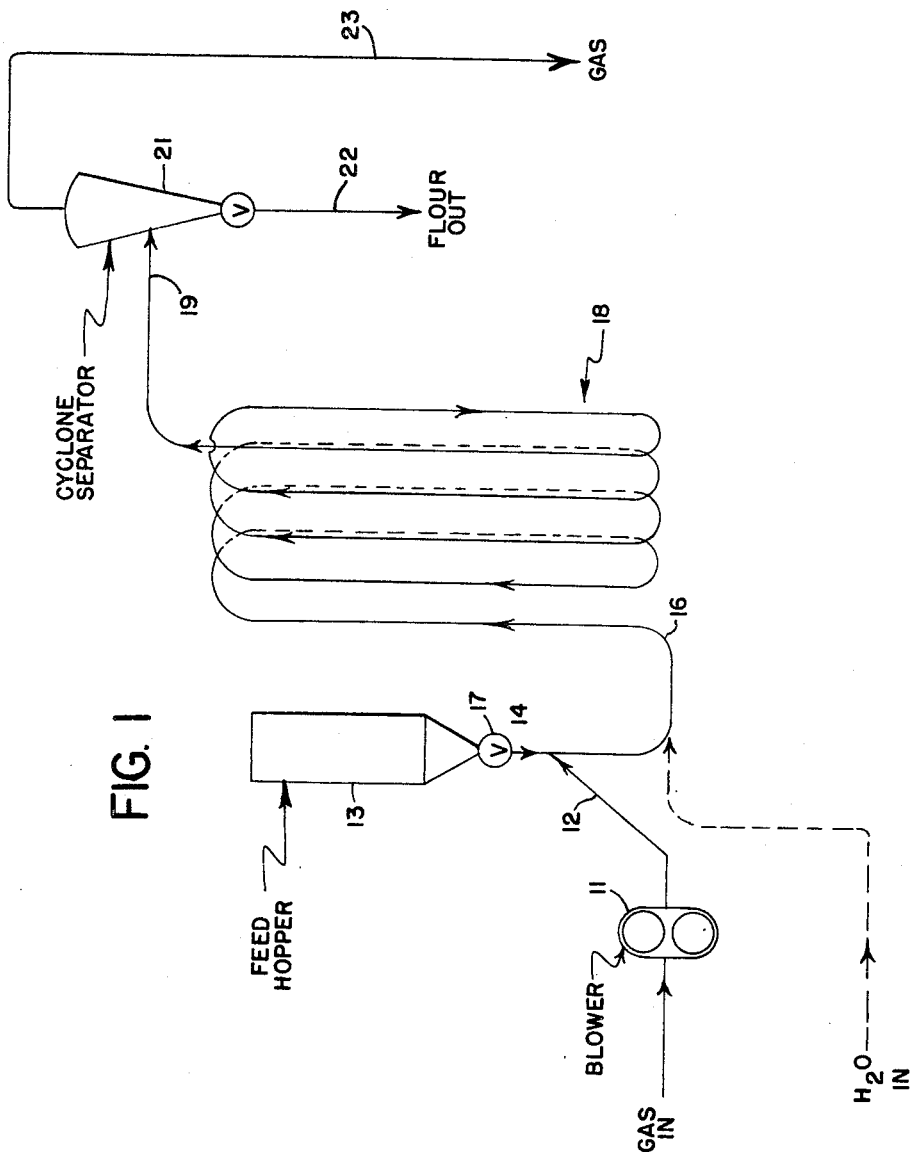

The present invention relates to a method for treating food products and more particularly to a method for controlling the bulk density of flour.

Recipes for preparing food products such as bread and cake are set forth in volumetric measurement. This is particularly true of recipes used in the home where the recipe sets forth measurements of flour in terms of cup measurement. Since volumetric measurements is and has been used for many, many years, the maintenance of high quality in the production of home baked bread, cakes and other flour containing products depends upon a uniform bulk density for the flour used in such recipes. It has been found that a cup of flour which contains a low bulk density will tend to supply insufficient flour in many recipes to provide optimum quality baked goods.

One obvious solution to the problem of insuring an adequate quantity of flour in a recipe, would be to change the recipe and set forth the measurements in terms of the weight of flour. For practical purposes, however, this is not a feasible solution since recipes for home use are traditionally set forth in volumetric terms and a change to weight measurement which is frequently used in the baking industry would not be practical or acceptable to most homemakers.

There are a number of other ways in which the bulk density of all purpose flours may be increased. For example, wheat types can be selected in order to insure a uniform bulk density in the finished product. This approach is difficult to achieve since desirable wheat varieties are not always available for purchase due to reasons such as weather conditions and the like. Further, wheat varieties may vary over a wide range thus defeating the use of a particular variety and requiring almost constant evaluation of the various wheat varieties in order to insure a particular bulk density in the end product. Other methods of controlling the bulk density of the finished flour product include changes in milling flow, changes in the degree of milling at various points of the mill process and classification of the finished flour to remove low density fines. However, most of these methods fall short of an ideal solution for various reasons. Most of these methods would require heavy capital investment to effectuate use of a particular procedure. Even with high cost investments, certain of the procedures are not sufficiently understood to insure uniform bulk density of the finished product.

Accordingly, it is an object of the present invention to provide a new and improved method of treating a flour product.

It is a further object of the present invention to provide a new and improved process for controlling the bulk density of flour.

It is a further object of the present invention to provide a new and improved method for controlling the bulk density of hard wheat flour.

It is another object of the present invention to provide a new and improved method of controlling the bulk density of hard wheat flour by aerating and drying the flour.

A further object of the present invention is to provide a new and improved process for controlling the bulk density of wheat flour by aerating and drying the flour after the flour has been moistened thereby controlling the bulk density of the flour while maintaining a preselecteed moisture lvel of the flour.

More particularly in accordance with the present invention, a hard wheat flour is introduced into a zone where the flour is agitated to disperse the individual flour particles. The dispersed flour particles are then aerated with an aerating gas which also drys the flour.

Figure 2:
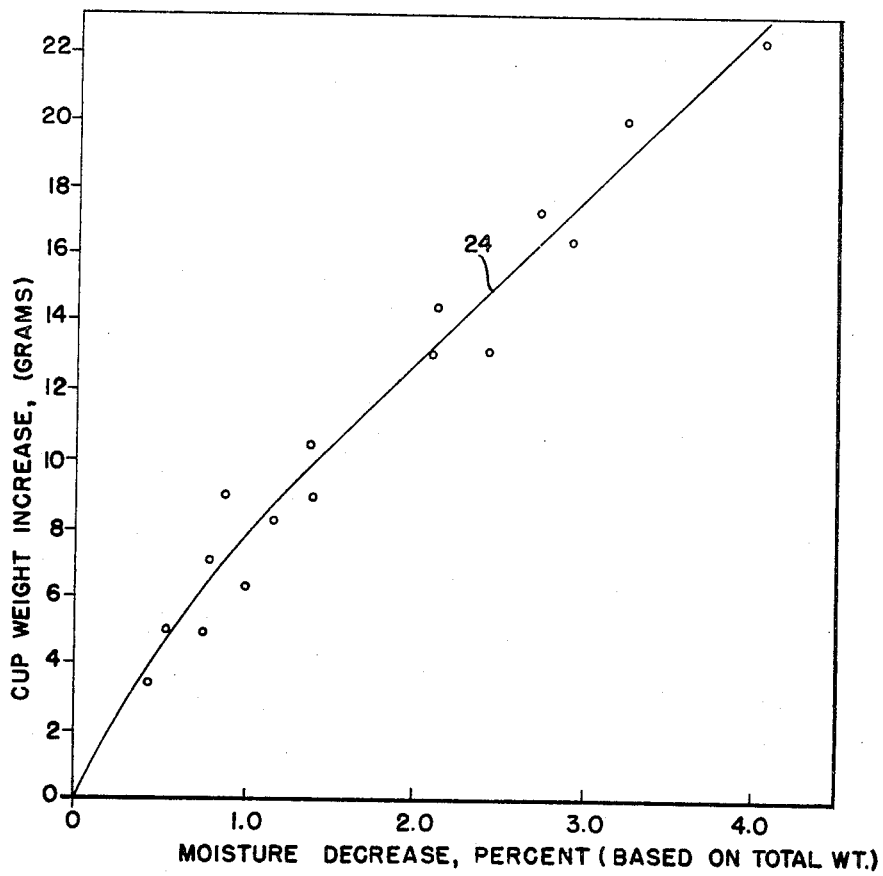
Figure 3:
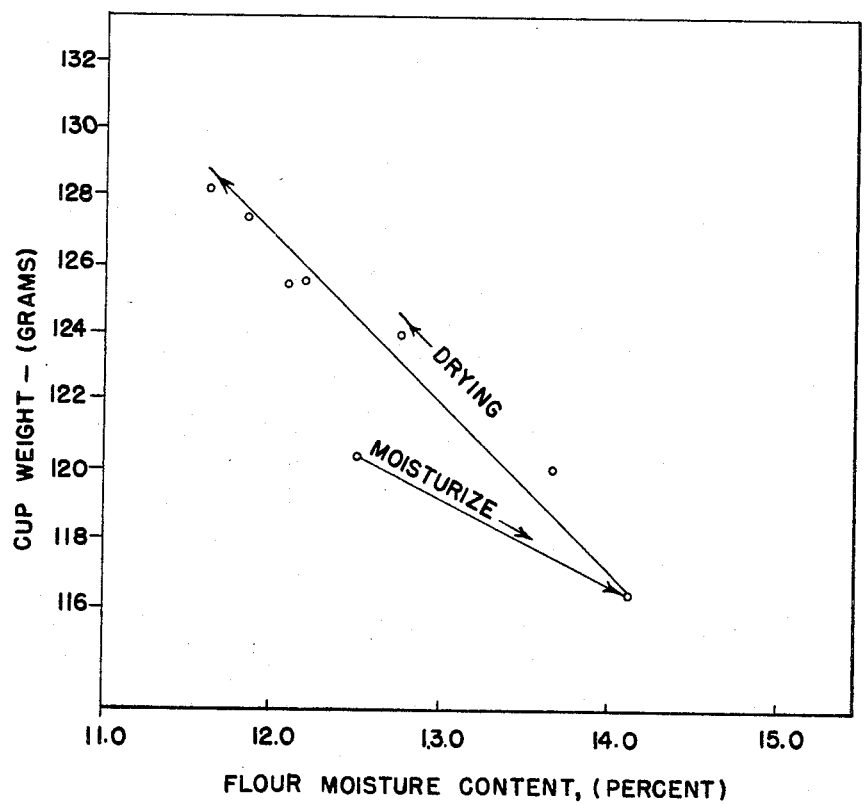
Figure 4:
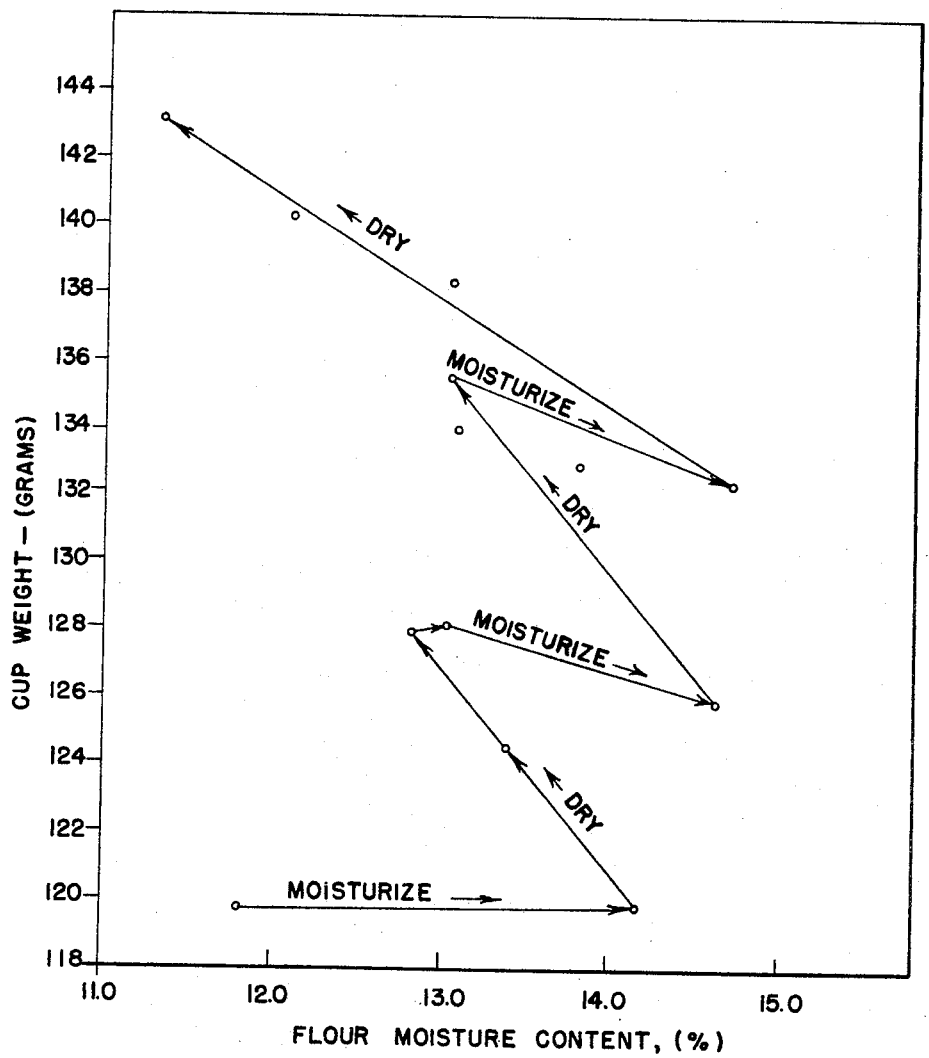

For a better understanding of the present invention reference may be made to the accompanying drawings in which:

FIGURE 1 is a schematic drawing illustrating a process for controlling bulk density of flour, FIGURE 2 is a graph showing the increase in cup weight versus the decrease in moisture as a flour product is aerated and dried, FIGURE 3 is a graph illustrating the increase in bulk density of flour when it is moisturized prior to aeration and drying, and FIGURE 4 is a graph illustrating repeated moisturizing and aeration and drying with resultant increase in cup weight of a flour product.

Frequently a hard wheat flour such as an all purpose flour will have a cup weight of from about 109 to about 111 grams per cup. (Cup weight is hereindefined to mean the weight in grams of a cup of sifted flour in which the cup of flour is measured by first spooning the sifted flour into a standard measuring cup of 236 cubic centimeters so that the flour does not become packed and then striking off the excess flour with a straight edge leaving the cup filled exactly to the top.) Products prepared from flour having the above-noted cup weight will frequently be of poor quality, not because the flour and other ingredients are of poor quality but simply because the housewives preparing the recipe will fail to include enough flour by weight in the recipe.

A more acceptable cup weight for flour products which are used in home recipes or in other recipes where the recipe is set forth in terms of volumetric measurement, would be a flour having a cup weight of from about 119 to about 130 grams per cup. It has been found that all purpose flour which is all hard wheat or substantially all hard wheat can be increased in cup weight by a combination of aeration of the flour and drying of the flour. Experiments have revealed that simple aeration of the flour will result in only a slight increase in the cup weight of a given sample of the flour. Further experiments have revealed that simply drying the flour will also increase the cup weight of the flour only slightly. However, it has been found from a variety of experiments using different samples of flour that combining the steps of aerating and of drying will result in a substantial increase in the cup weight of the flour. A typical example of such an increase in cup weight is an increase from 110 grams to 119 grams per cup.

The flour product can be aerated and dried in any one of a number of systems. For example, the flour having a moisture content of about 13.0% to about 14.5% by weight may simply be aerated by sifting in the presence of relatively dry air which will tend to dry the flour product. This has been found satisfactory, however for production purposes and for quality control purposes this is not a preferred system. A more preferred system involves a pneumatic conveying system wherein the volume of air or gas for aerating the flour can be precisely controlled as to volume and movement. Such a system is illustrated in FIGURE 1 of the drawings wherein the aerating gas is pumped into the pneumatic system by a pump 11 through a conduit 12. Flour is discharged from a hopper 13 through a line 14 into a conduit 16 where the aerating gas aerates the flour. A control valve 17 may be utilized to regulate the volume flow of flour into the conduit 14 for discharge into the conduit 16. Valves may be provided in the gas supply to regulate the volume of aerating gas utilized for aerating and drying. By controlling the relative humidity of the aerating gas, which is preferably air, the product will be simultaneously dried from a moisture level by weight of about 13.0% to about 14.5% to a level of about 11.0% to about 14.0% while it is being aerated. The drying will take place in the conduit 16, as the aerating gas and flour move from the input end of the pneumatic system, generally designated by numeral 18, to the output end 19 where the flour and aerating gas are discharged into a cyclone separator 21. In the cyclone separator 21, the flour is separated from the gas. The flour is discharged through a discharge conduit 22 and the aerating gas which may be heated is discharged through the gas discharge 23.

The conduit 16 acts as a zone of agitation where the individual flour particles are dispersed by the air flowing through the system or it may be dispersed initially by some other mechanical means for dispersing flour particles. This dispersion of the flour particles permits more complete aeration of the flour by the aerating gas. This dispersion also permits more uniform drying of the flour during the movement of the flour through the pneumatic sysem.

The invention can be more completely understood by reference to the following example.

EXAMPLE I

A general all purpose flour was pneumatically conveyed at a rate of 10 pounds per minute through a two-inch inside diameter tubing of 100 feet in length. The conveying gas (air in this case) was flowing through the pipe at the rate of 125 cubic feet per minute and had a dry bulb temperature of 76° F. and a relative humidity of 44%. The flour was introduced into the tubing where it was agitated by the moving air. The flour had a moisture level of 12.85% by weight. The initial cup weight of the flour was 110 grams. The flour was recycled through the tubing ten times but the air was not recycled. The flour was then separated from the air. The resulting aerated and dried flour contained a moisture level of 11.40% and had a cup weight of 121 grams. The moisture content was determined on the Brabender 10-sample atmospheric-pressure normal convection oven operating at 132° C. The cup weight was determined by filling a cup in the manner described hereinbefore in a room with the air conditioned to 72° F. at 50% relative humidity. It will be observed that the cup weight of the flour was substantially increased by the steps of aeration and drying of the flour. There was a net loss of moisture by the flour per cup which was approximately .341 gram but this resulted in a cup weight increase of 11 grams.

It has been found that he temperature of the aerating gas may vary over a considerable range for the purpose of drying flour. Excessively high temperatures are to be avoided since they tend to heat the flour to undesirably high temperatures causing a loss of quality in the flour. The flour should not be heated to more than about 120° F. since the flour will begin to deteriorate at higher temperatures. The air temperature may be relatively high and the absolute temperature of the air is not a critical factor provided the flour is not combined with the air for an extended period of time so that the flour temperature exceeds about 120° F.

Reference to FIGURE 2 of the drawings will illustrate a curve 24 which was prepared from a number of samples of flour which were aerated and dried according to the procedures set forth in Example I. The graph illustrates the relationship between the reduction of moisture in the flour versus the increase in cup weight in grams. The graph illustrates that hte increase in cup weight is generally proportional to the loss of moisture of the flour when the flour is aerated and dried simultaneously. It was found, however, during the experiments that the cup weight increase was not as significant when the product was merely dried. Likewise, it was found that mere aeration of the flour did not result in the expected increase in cup weight. However, when the flour particles were aerated and simultaneously dried under otherwise identical conditions, the cup weight unexpectedly increased dramatically as illustrated in FIGURE 2.

The above described process also provides a method for controlling the cup weight of a hard wheat fluor independent of the final moisture content. It was found that the flour could be moistened to a substantial degree and then aerated and dried to the initial moisture with a resulting increase in cup weight.

Frequently, flour as it comes from the usual milling machinery, will have a moisture content of about 13.0% to about 14.5% by weight. This is also an acceptable level of moisture for packing the flour in bags for resale to the consumer. It is sufficiently dry for preservation purposes and there is sufficient moisture to insure good baking results. Therefore it may be desirable to maintain this moisture level or whatever moisture level may be selected as optimum in order to produce an acceptable end product. It has been found that the moisture level of flour can be increased by addition of the moisture to the flour and then the flour may be aerated and dried back to the original moisture level with a resulting increase in the cup weight of the flour. Thus it will be observed that the aeration in drying of the flour according to the present invention permits independent control of the cup weight of the flour and the moisture level of the flour.

Moisture may be added to the flour prior to aeration and drying by one of several methods. For example, water may be sprayed upon the flour in a fine mist in order to uniformly distribute the moisture throughout the flour. A preferred method of applying moisture to the flour is by the use of steam. Steam was found to raise the moisure level of the flour product to a satisfactory degree and provide a uniform application of the moisture to the flour in a pneumatic system such as that illustrated in FIGURE 1 of the drawings. Care must be taken to prevent overheating of the flour as previously noted. It was found that about 2% moisture addition with steam was an optimum moisture application. With a 2% increase in the moisture (measured by weight) the flour did not become overheated and thus retained an overall high quality. Addition of excessive amounts of steam tends to heat the flour to undesirably high temperatures and at the same time, the full moistening effect of steam is not utilized. This was found to be true because at higher gas or air temperatures a large portion of the steam is used merely to saturate the gas. This phenomenon was illustrated by preparation of samples of flour moistened with varying amounts of steam. In a first run, .06 pounds of steam per pound of flour was used and in a second run .10 pound of steam per pound of flour was used. In both cases, the air to flour ratio was slightly greater than 1:1. In the first case, .016 pound of steam went into the flour while the remaining moisture was required to saturate the air at 105° F. In the latter case, .022 pound of steam went into the flour, while the remaining moisture was needed to saturate the air at 115° F. In the first case, the affluent flour temperature was 107° F. and in the second case, the affluent flour temperature was 120° F.

If more moisture than a 2% increase by weight is necessary in order to achieve the cup weight desired upon aeration and drying and in order to achieve a predetermined moisture level for the finished product, then the flour may be repeatedly passed through a steam moistening stage if steam is used. Such a procedure was tried successfully and an illustrative example of an increase in the moisture content achieved by multiple passes of the flour through a moistening step are illustrated by an increase of the moisture content of flour from 12.9% to 15.0% to 16.1% to 17.1% in three successive passes. Accordingly, it will be observed that the moisture level can be satisfactorily increased in steps and yet maintain a reasonably low flour temperature.

Preferably steam is added to the flour after the flour has been introduced into the feed hopper and after the flour has been agitated. This produces a uniform wetting of the flour product prior to the aeration and drying of the flour. Following the addition of the moisture, the flour is then aerated and dried as set forth in Example I with a resulting increase in cup weight. This process will be more fully understood by reference to Example II.

EXAMPLE II

Flour from the same lot as used in Example I above was moistened by injecting steam into the pneumatic system described in Example I. The moistened flour was then dried exactly as in Example I. The initial flour moisture by weight was 12.90% and contained 111 grams per cup weight. The flour was moistened so that the flour contained 15.00% by weight of moisture and had a cup weight of 110 grams. The flour was then aerated and dried as in Example I to a moisture level of 13.35% of moisture and the cup weight was found to be 119 grams. This same flour was then further dried to a moisture level of 12.90% by weight, which is the same moisture level that the flour initially contained. The cup weight was found to be 125 grams.

Thus it can be seen from the above Example II that the flour can be wetted and subsequently aerated and dried to return the moisture level to the original value with a resultant substantial increase in the cup weight of the product. In Example II it is noted that while the final moisture level of the flour was unchanged, the cup weight of the product was increased by a full 14 grams per cup.

EXAMPLE III

Another lot of flour was selected which had an initial moisture level of 13.0% by weight and a cup weight of 111 grarms per cup. This flour was moistened to increase the moisture level to 15.0% by weight. The cup weight of this product was found to be 109 grams per cup. The moistened flour was then dried and aerated exactly as set forth in Example I and was returned to the initial moisture level of 13.0% by weight. The aerated and dried flour was then found to have a cup weight of 123 grams, a full 12 gram increase per cup.

FIGURE 3 of the drawings will illustrate the moistening and subsequent aeration in drying of flour. It is noted that moisturizing usually caused a decrease in the cup weight of the flour but that the subsequent aeration and drying of the moistened flour more than compensated for the loss of cup weight and resulted in the net increase of the cup weight of the finished product.

Samples of wheat flour have been repeatedly moisturized and subsequently repeatedly aerated and dried with the result that normally the moisturizing results in a slight, if any, decrease in the cup weight of the flour but the subsequent aeration and drying resulted in a net increase in the cup weight. This repeated moisturizing and subsequent aeration and drying is illustrated in FIGURE 4 of the drawings where it will be noted that flour which had a cup weight of 120 grams was first moisturized to somewhat more than 14% moisture by weight. The product was then aerated and dried with a substantial increase in the cup weight. This procedure was repeated several more times with an alternate increase in the cup weight of more than 20 grams.

Thus the final cup weight can be regulated independently of the final moisture content of the flour. Reference to the graph in FIGURES 3 and 4 amply illustrate this. This permits the attainment of a desired moisture level in a final product with a specific cup weight varying from the original cup weight of the milled flour to a cup weight which is very much higher than the original flour. This independent control of the moisture and the cup weight of the flour permits the flour to be "tailor made" so that it will function properly in recipes which call for measurements on a volumetric basis.

The exact reason for the increase in cup weight as a result of aeration and drying is not exactly known. However, it is believed that some surface characteristics of the individual flour particles are being altered in order to produce an increased bulk density of the flour.

It is to be understood that the above examples and illustrations are merely illustrative of the principles of the invention and that many variations thereof may be practiced by those skilled in the art which would be within the spirit and scope of the invention. For example, a system other than a pneumatic system might be utilized in wetting the flour. The flour may be introduced into an intensive mixer wherein paddles or similar mechanical means are utilized to agitate the flour prior to aeration and drying. Aeration and drying can be carried out in something other than a closed pneumatic system. For example, the flour may be simply sifted and dried in the presence of ambient air. These and many other variations are possible and fall within the scope of the invention.

Now therefore we claim:

1. A process for increasing the bulk density of hard wheat flour which comprises the steps of directing a hard wheat flour having a moisture content of about 13.0% to about 14.5% by weight into a zone of agitation, agitating the flour to disperse the individual flour particles, moistening the dispersed flour particles to increase the moisture content by about 1% to about 2% by weight, passing heated air through the moistened flour for a sufficient period of time to aerate the flour and simultaneously dry the flour to return the moisture content of the flour to about 13.0% to about 14.5% by weight, and then removing said flour from said heated air before the flour is heated to more than about 120° F. thereby obtaining a hard wheat flour of increased bulk density over the starting material.

References Cited

UNITED STATES PATENTS

| | | | |
|---|---|---|---|
| 1,155,977 | 10/1915 | Vernon | 99—93 |
| 1,727,429 | 9/1929 | Fisher et al. | 99—93 |
| 2,880,093 | 3/1959 | Kuhlmann et al. | 99—93 |
| 2,893,871 | 7/1959 | Griffin | 99—56 |
| 3,212,904 | 10/1965 | Gould et al. | 99—93 |
| 3,251,695 | 5/1966 | Gidlow et al. | 99—93 XR |
| 3,360,865 | 1/1968 | Galle et al. | 34—10 |

FOREIGN PATENTS

| | | |
|---|---|---|
| 310,125 | 4/1929 | Great Britain. |
| 644,621 | 7/1962 | Canada. |

RAYMOND N. JONES, Primary Examiner